US007768506B2

(12) United States Patent
Tseng

(10) Patent No.: US 7,768,506 B2
(45) Date of Patent: Aug. 3, 2010

(54) GATE DRIVING DEVICE WITH CURRENT OVERDRIVE PROTECTION AND METHOD THEREOF

(75) Inventor: Ching-Wu Tseng, Taipei County (TW)

(73) Assignee: Novatek Microelectronics Corp., Hsinchu (TW)

( * ) Notice: Subject to any disclaimer, the term of this patent is extended or adjusted under 35 U.S.C. 154(b) by 1384 days.

(21) Appl. No.: 11/161,208

(22) Filed: Jul. 27, 2005

(65) Prior Publication Data

US 2006/0132475 A1 Jun. 22, 2006

(30) Foreign Application Priority Data

Dec. 17, 2004 (TW) .............................. 93139320 A

(51) Int. Cl.
*G06F 3/038* (2006.01)
*G09G 5/00* (2006.01)

(52) U.S. Cl. ........................ 345/204; 345/100; 345/211

(58) Field of Classification Search ........... 345/98–104, 345/204–213
See application file for complete search history.

(56) References Cited

U.S. PATENT DOCUMENTS

2003/0193320 A1* 10/2003 Sugimura .................. 323/272

* cited by examiner

*Primary Examiner*—Amr Awad
*Assistant Examiner*—Michael Pervan
(74) *Attorney, Agent, or Firm*—Jianq Chyun IP Office

(57) ABSTRACT

A gate driving device comprises a control circuit, a shift register circuit, a level shifter, a buffer block and a current overdrive protection device. The control circuit receives and outputs the logic control signals. The shift register circuit receives the logic control signals and sequentially outputs N horizontal low-voltage pulse signals from the first to Nth horizontal lines. The level shifter receives and transforms the horizontal low-voltage pulse signals into positive/negative high-voltage signals. The buffer block receives the horizontal positive/negative high-voltage signals and buffers the driving of the output level device. The current overdrive protection device receives the logic control signal and the horizontal low-voltage pulse signals. The current overdrive protection device, while being properly triggered, outputs the reset signal to prevent the sudden current spike. Accordingly, the damage of the gate driving device is avoided.

7 Claims, 9 Drawing Sheets

GATE DRIVING DEVICE WITH CURRENT OVERDRIVE PROTECTION AND METHOD THEREOF

CROSS-REFERENCE TO RELATED APPLICATION

This application claims the priority benefit of Taiwan application serial no. 93139320, filed on Dec. 17, 2004. All disclosure of the Taiwan application is incorporated herein by reference.

BACKGROUND OF THE INVENTION

1. Field of the Invention

The present invention relates to a gate driving device, and more particularly, to a gate driving device with current overdrive protection.

2. Description of the Related Art

A general gate driving device of an amorphous silicon thin film transistor liquid crystal display (TFT LCD) uses a high voltage to trigger the positioned horizontal amorphous silicon TFT so that the data of the source driving device can be transmitted to liquid crystal capacitors. Before the next horizontal line is going to be scanned, a negative high-voltage should be used to turn off the horizontal amorphous thin film transistors so as to maintain the data of the source driving device in the liquid crystal capacitors. The difference between the input and output voltages of the gate driving device can be tens of folds. Under an abnormal operation, the LCD or the gate driving device may be damaged.

Referring to FIG. 1, the gate driving device of the traditional amorphous silicon TFT LCD comprises a control-shift register circuit 10, a voltage level shifter 30, and a buffer block 40 with N high voltage buffer driving circuits. The control-shift register circuit 10 receives a activate pulse signal DIO, which can generate an activate pulse signal DOI for another gate driving device, a clock signal CLK, and an output enable signal OE. The voltage level shifter 30 receives and transforms the low-voltage logic signals into the positive/negative high-voltage (VGG and VEE) output signals. The high-voltage buffer driving circuits of the buffer block 40 are used to buffer the positive/negative high-voltage signals and to drive the output level device of the amorphous TFT LCD.

The gate driving device shown in FIG. 1 is under normal situation. Its input waveform is shown in FIG. 2A. When the gate driving device is activated by an activate pulse signal DIO, the first to the Nth high voltage horizontal lines are sequentially and individually enabled according to the clock signal CLK. The output enable signal OE is to prevent the output overlap between two neighboring horizontal lines. When signals are abnormally missed in the system, the timing controller will output abnormal signals and the gate driving device will be under abnormal situation. Referring to FIG. 2B, though the operations of the clock signal CLK and the output enable signal OE are normal, the activate pulse signal DIO is a pulse signal with a long period of time. As a result, the horizontal high-voltage output signals have N horizontal switches. IGG will generate a current spike between two output enable signals OE. Due to the high sudden current and the high average current, the circuit routes for high voltage on the LCD ITO (Indium tin oxide) are not sufficient and cannot stand the high current and will be damaged. In some situations, the gate driving device is latched and the LCD ITO is irreparably damaged.

SUMMARY OF THE INVENTION

Accordingly, the present invention is directed to a gate driving device with a current overdrive protection mechanism. The present invention practically overcomes one or more issues resulting from the present technical limitations and inconvenience.

The present invention provides a gate driving device. The gate driving device comprises: a control circuit, a shift register circuit, a voltage level shifter, a high-voltage buffer block and a current overdrive protection circuit. The control circuit receives and outputs a plurality of logic control signals. The shift register circuit receives the logic control signals, and sequentially outputs horizontal low-voltage pulse signals from the first to Nth horizontal lines. The voltage level shifter receives and transforms the horizontal low-voltage pulse signals into positive/negative high-voltage output signals. The high-voltage buffer block receives the positive/negative high-voltage output signals from the horizontal lines to buffer a driving for an output-level circuit. The current overdrive protection circuit receives the logic control signal and the horizontal low-voltage pulse signals, and outputs a reset signal while being triggered to prevent generation of a sudden current spike and to avoid damage to the gate driving device.

An embodiment of the present invention provides a control circuit. The circuit comprises: a flip-flop circuit and a multiplexer. An input terminal of the flip-flop circuit receives a logic high level, a clock terminal of the flip-flop circuit receives an activate pulse signal, a clear terminal receives the reset signal, and an output terminal of the flip-flop circuit outputs a selective signal. The multiplexer comprises a plurality of signal input terminals, a selective terminal and a signal output terminal. One of the signal input terminals receives a logic-low level signal, and one of the signal input terminals receives the activate pulse signal. The selective terminal receives the selective signal, and the signal output terminal outputs the data signal.

An embodiment of the present invention provides a shift register circuit. The shift register circuit comprises: an output enable terminal receiving the output enable signal; a data input terminal receiving the data signal, a clock terminal receiving the clock signal; N horizontal low-voltage pulse output terminals for outputting the first to Nth horizontal lines with low voltage horizontal pulse signals based on variations of the clock signal and data signal; and a reset input terminal receiving the reset signal.

An embodiment of the present invention provides a voltage level shifter. The voltage level shifter comprises: N low voltage horizontal pulse signal input terminals receiving the low voltage horizontal pulse signals of the first to Nth horizontal lines; and N positive/negative high-voltage output terminals sequentially transforming the voltage levels into positive/negative high-voltage output signals of the first to Nth horizontal lines.

Another embodiment of the present invention provides a high-voltage buffer block. The block comprises N high-voltage buffer driving circuits. Each of the high-voltage buffer driving circuits receives the positive/negative high-voltage output signals and buffers the driving of the output device of the thin film transistor.

An embodiment of the present invention provides high-voltage buffer driving circuits. The high-voltage buffer driving circuits can be PMOS or NMOS high-voltage inverters.

Further, an embodiment of the present invention provides a current overdrive protection circuit. The circuit comprises a logic operational circuit and a logic responsive circuit. The logic operational circuit receives horizontal low voltage pulse signals from the first, the second, the third, . . . , the Mth horizontal lines. Wherein, the M horizontal low voltage pulse signals are selected from the N horizontal low voltage horizontal pulse signals, and M is smaller than, or equal to, N. The logic operational circuit outputs a logic operational signal. The logic responsive circuit receives the logic operational signal and the logic control signal and outputs the reset signal.

The logic operational circuit according to an embodiment of the present invention can be an AND gate or an NAND gate comprising M input terminals.

The logic control signal received by the logic responsive circuit according to another embodiment of the present invention is an output enable signal.

The logic responsive circuit according to an embodiment of the present invention can be a positive edge-triggered flip-flop, a negative edge-triggered flip-flop, or a double edge-triggered flip-flop.

In another aspect, the present invention provides a current overdrive protection method. The mechanism comprises the following steps: receiving M horizontal low-voltage pulse signals from the first to Mth horizontal lines (wherein, the M horizontal voltage pulse signals are selected from the N horizontal voltage pulse signals, and M is smaller than, or equal to, N) and outputting a logic operational signal; receiving the logic operational signal and controlling an output of a reset signal by an output enable signal; the reset signal resets the low voltage horizontal pulse signals from the first to Mth horizontal lines and clears a selective signal so as a data signal is in a logic-low level. The horizontal low voltage pulse signals of the first to the Mth horizontal lines are latched as logic-low level until the next activate pulse signal is triggered.

The logic operational signal according to another embodiment of the present invention uses the logic-high or logic-low level operation to output the reset signal.

The reset signal according to an embodiment of the present invention can be a logic signal with a logic-high level or a logic-low level.

The above and other features of the present invention will be better understood from the following detailed description of the preferred embodiments of the invention that is provided in communication with the accompanying drawings.

DESCRIPTION OF EMBODIMENTS

The preferred features of the embodiments of the present invention will be interpreted by accompanying the figures described below. The scope of the present invention is not limited to these embodiments. Note that the present invention is not limited to the specific dimensions or ratios in the figures, either. In the present invention, the structures and materials of these embodiments can be properly modified.

Figure 1:
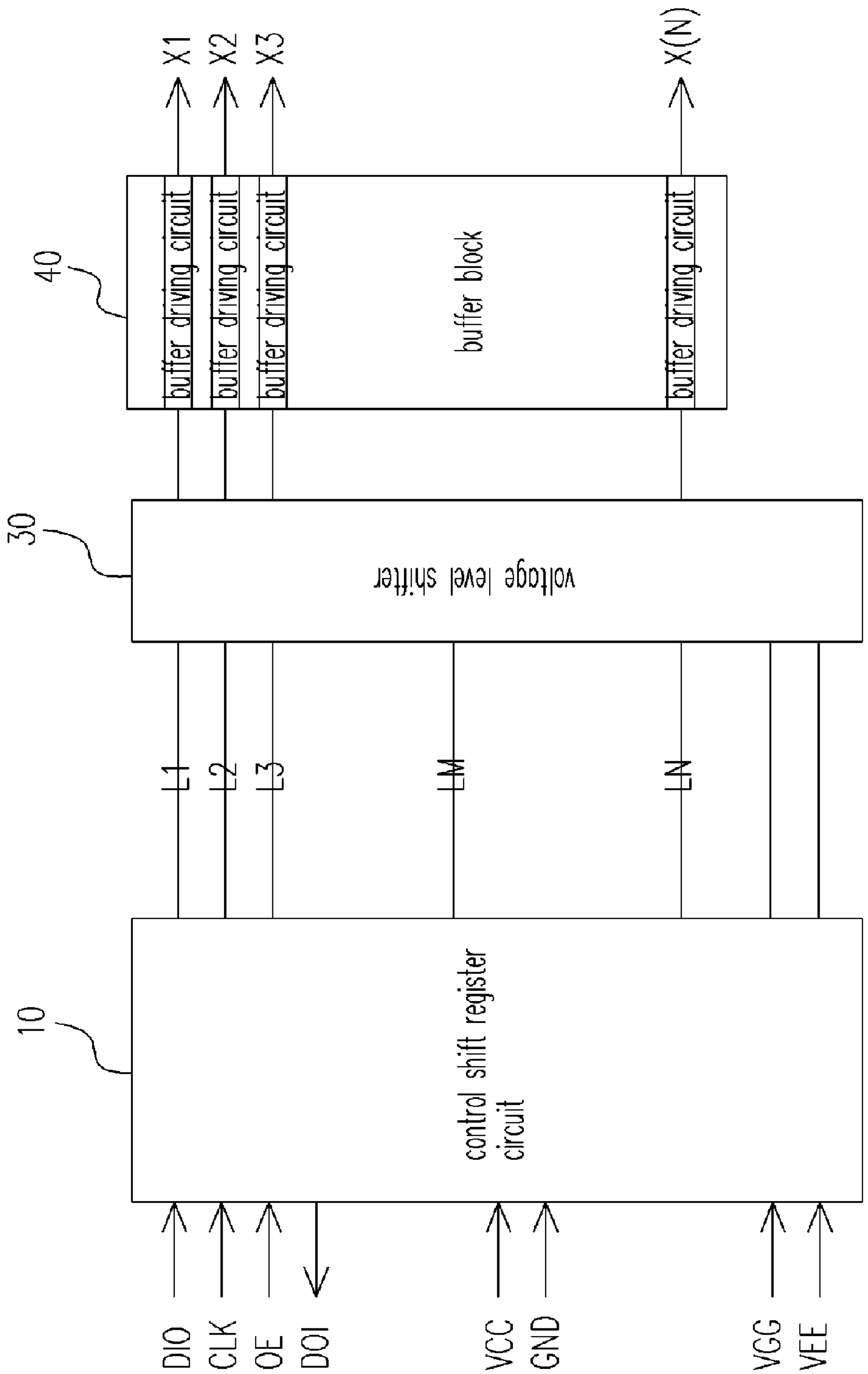
FIG. 1 (PRIOR ART)
FIG. 1 is a schematic block diagram showing a traditional gate driving device.
Figure 2A:
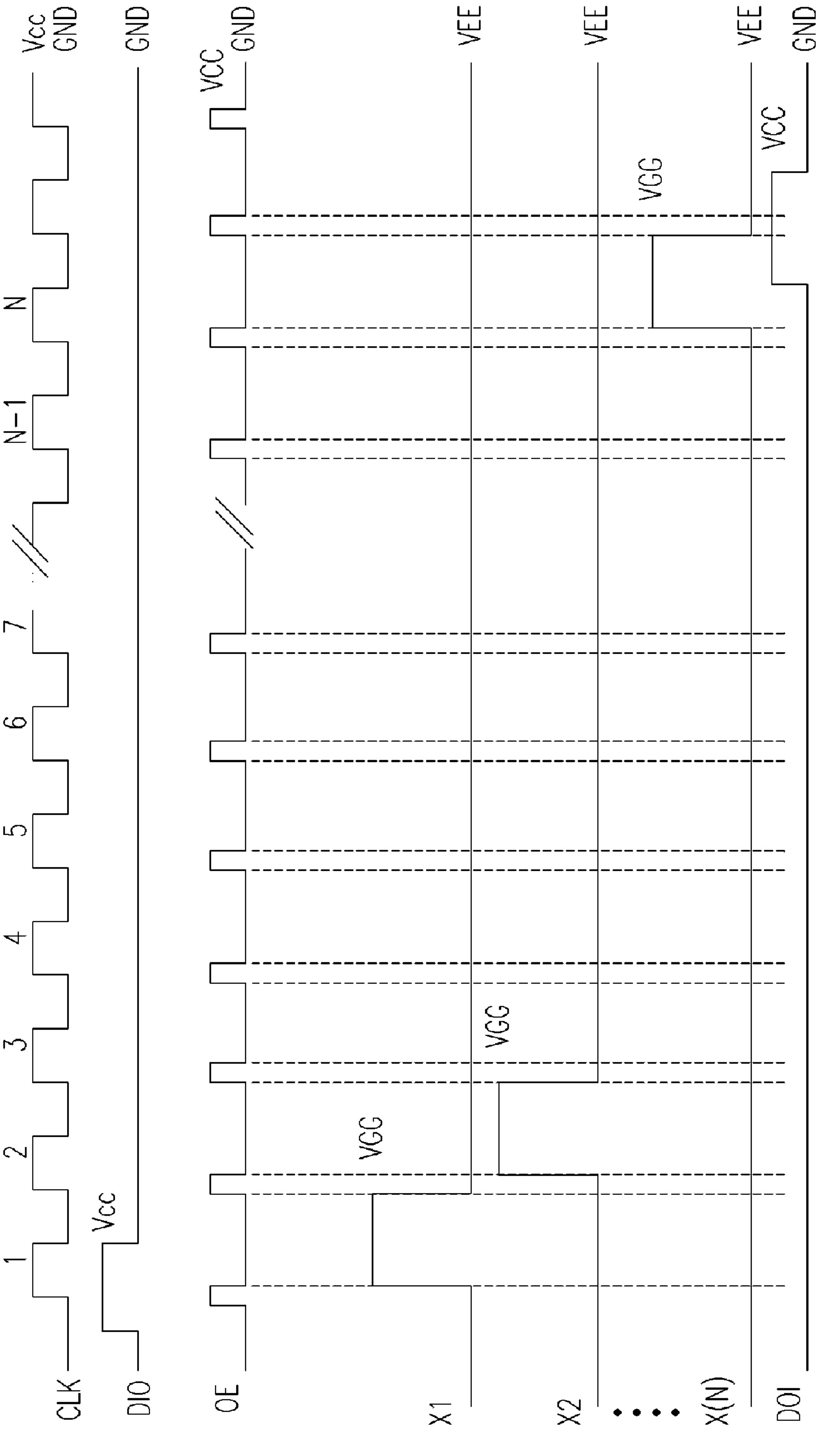
FIG. 2A (PRIOR ART)
FIG. 2*a* is a drawing showing a sequence of input and output signals when a gate driving device is under a normal situation.
Figure 2B:
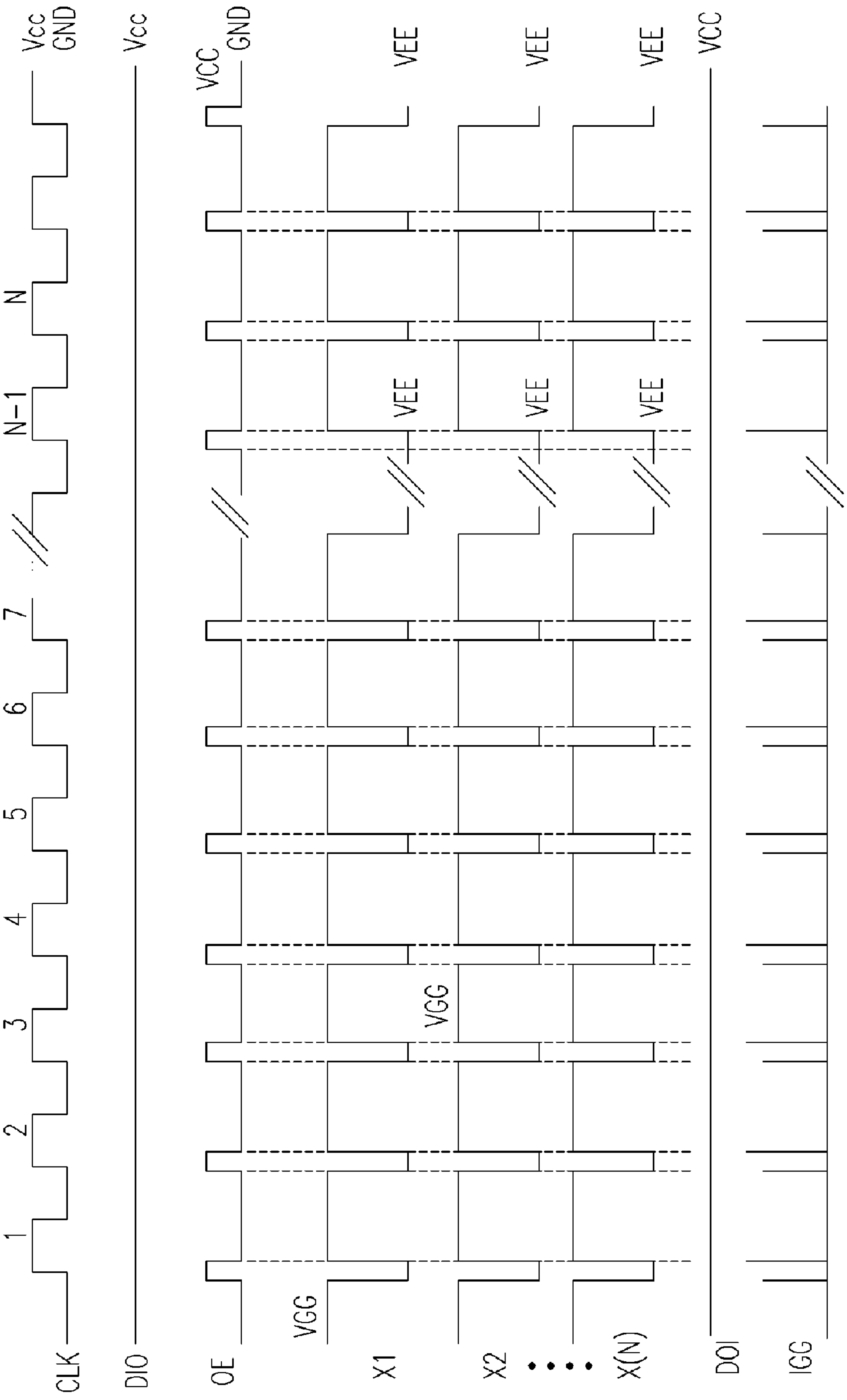
FIG. 2B (PRIOR ART)
FIG. 2*b* is a drawing showing a sequence of input and output signals when a gate driving device is under an abnormal situation.
Figure 3:
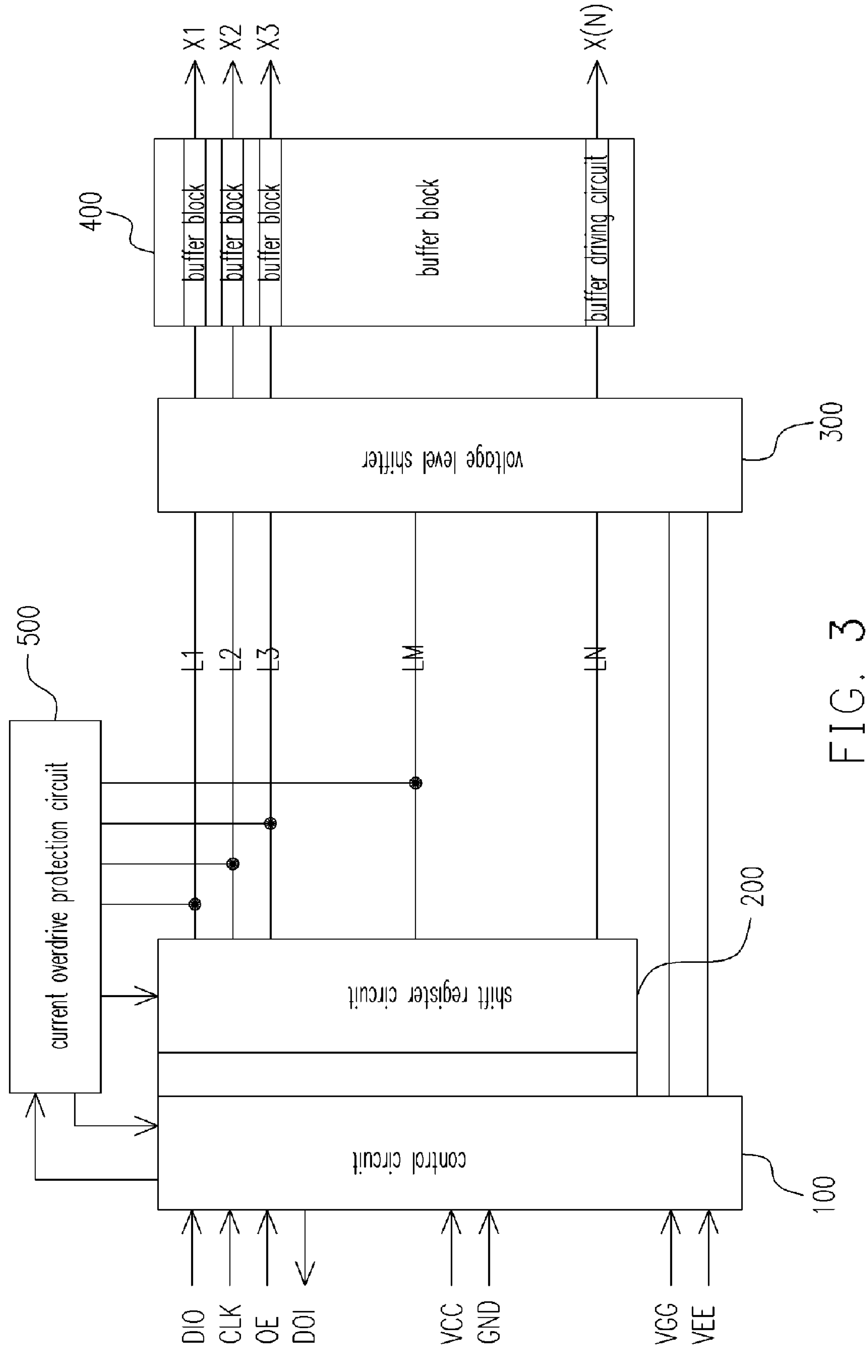
FIG. 3 is a schematic block diagram showing a gate driving device according to an embodiment of the present invention. Wherein, the gate driving device comprises a control circuit, a shift register circuit, a voltage level shifter, a buffer block with N high-voltage buffer driving circuits, and a current overdrive protection circuit.

FIG. 3 is a schematic block diagram showing a typical gate driving device according to an embodiment of the present invention.

Referring to FIG. 3, the gate driving device comprises a control circuit 100, a shift register circuit 200, a voltage level shifter 300, a buffer block 400 with N high-voltage buffer driving circuits, and a current overdrive protection circuit 500.

The control circuit 100 receives an activate pulse signal DIO (which can generate an activate pulse signal DOI for another gate driving device), a clock signal CLK, an output enable signal OE, a reset signal RST; generates a back-end logic signal; and controls the supply of different voltages. The shift register circuit 200 receives the front-end logic signal, the clock signal CLK, the reset signal RST, and the horizontal low-voltage pulse signals (L1, L2, L3, . . . , LN) from the first to Nth horizontal lines. The voltage level shifter 300 receives and sequentially transforms the horizontal low-voltage pulse signals (L1, L2, L3, . . . , LN) from the first to Nth horizontal lines into the horizontal positive/negative high-voltage (VGG, VEE) signals (X1, X2, X3, . . . , X(N)) from the first to Nth horizontal lines. The high-voltage buffer block 400 receives the horizontal positive/negative high-voltage signals, and buffers the driving of the output level device of the display panel.

The current overdrive protection circuit 500 receives the logic control signal from the front-end control circuit 100 and horizontal low-voltage pulse signals, which are from the first to Mth horizontal lines of the shift register circuit 200 (wherein M is smaller than or equal to N). The current overdrive protection circuit 500 also outputs the reset signal while being properly triggered. As a result, the sudden current spike can be prevented.

The current overdrive protection circuit 500 can perform the operation by only receiving the M horizontal low-voltage pulse signals of the N horizontal low-voltage pulse signals from the shift register circuit 200.

Figure 4:
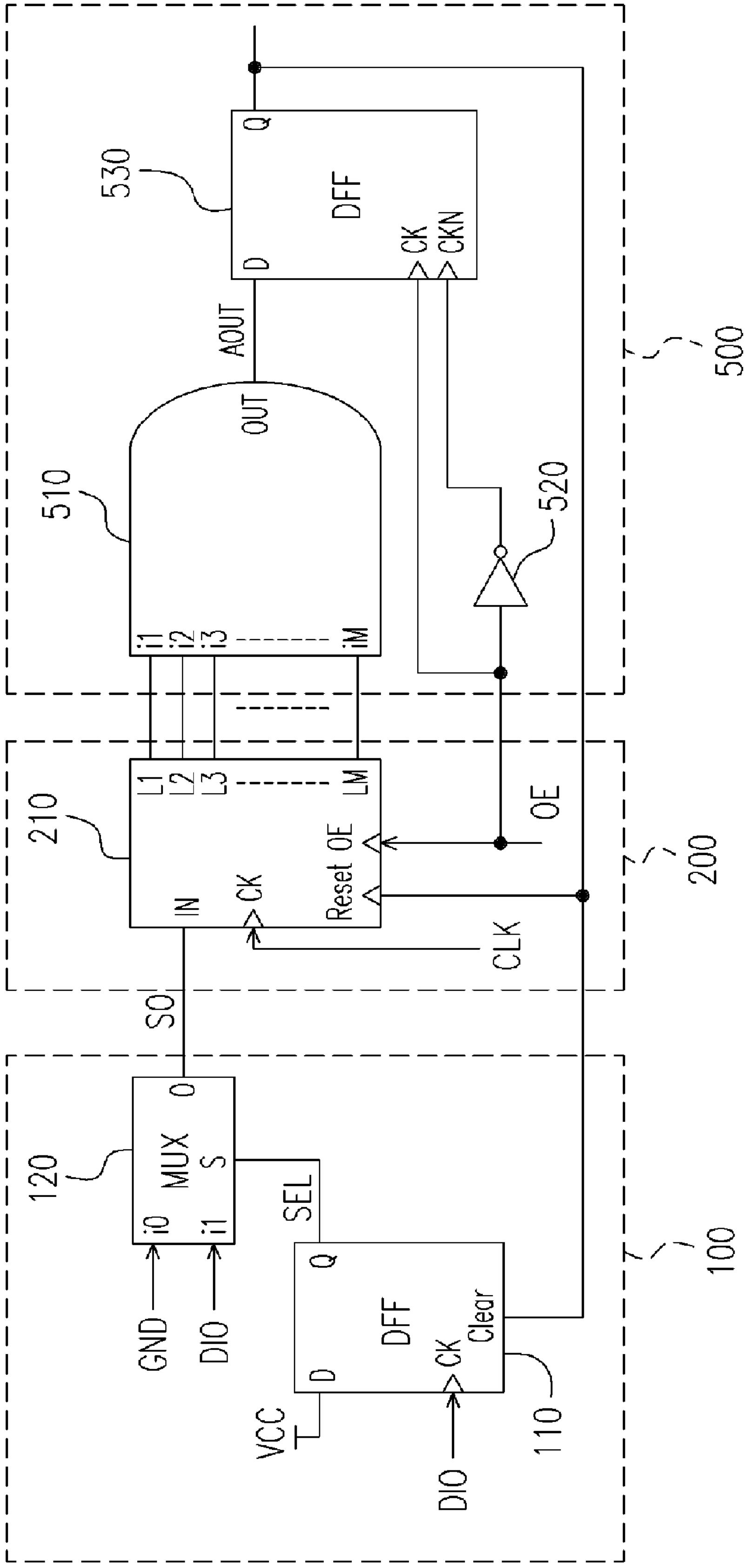
FIG. 4 is a drawing showing a current overdrive protection circuit and illustrating other periphery circuits in detail.

FIG. 4 is a drawing showing the current overdrive protection circuit 500 of FIG. 3 and other periphery circuits comprising partial detailed descriptions of the control circuit 100 and the shift register circuit 200.

The control circuit 100 comprises a first flip-flop 110 and a multiplexer 120. The first flip-flop 110 comprises an input terminal D receiving the logic-high level signal VCC, a clear terminal Clear receiving the reset signal RST, a clock terminal CK inputting the activate pulse signal DIO, and an output terminal Q generating the selective signal SEL. The multiplexer 120 comprises two signal input terminals. The 0th signal input terminal i0 provides the logic-low level signal GND. The 1st signal input terminal i1 provides the activate pulse signal DIO. The selective signal SEL received by the selective terminal S decides outputting the data signal SO generated from the output terminal O.

The shift register circuit 200 comprises a shift register 210. The shift register 210 comprises a data input terminal IN receiving the data signal SO, a reset terminal Reset receiving the reset signal RST, a clock terminal CK receiving the clock signal CLK, and an output enable terminal OE receiving the output enable signal OE. The shift register 210 also outputs the horizontal low-voltage pulse signals (L1, L2, L3, . . . , LM) of the first to Mth horizontal lines from the horizontal voltage pulse signal input terminals of the first to Mth horizontal lines.

The current overdrive protection circuit 500 comprises an AND gate 510 with M input terminals, a logic inverter 520, and a double edge-triggered flip-flop 530. The AND gate 510 comprises M input terminals (i1, i2, i3, . . . , iM) receiving the M horizontal low-voltage pulse signals (L1, L2, L3, . . . , LM) of the first to Mth horizontal lines, respectively. The output terminal of the AND gate 510 also outputs a logic operational signal AOUT. The logic inverter 520 inverses the output enable signal OE. The double edge-triggered flip-flop 530 comprises an input terminal D receiving the logic operational signal AOUT, a positive clock terminal CK receiving the output enable signal OE, a negative clock terminal receiving the inversed output enable signal OE, and an output terminal Q generating the reset signal RST.

Below is the description of the protection mechanism to prevent the current overdrive.

The AND gate 510 with the M input terminals receives the M horizontal low-voltage pulse signals of the first to Mth horizontal lines, and outputs the logic operational signal AOUT. The logic operational signal AOUT controlled by the output enable signal OE synchronously generates the reset signal RST. The reset signal RST resets the M horizontal low-voltage pulse signals of the first to Mth horizontal lines, and clears the selective signal SEL generated by the first flip-flop 110 so that the data signal SO is in the logic-low level. By the triggering of the reset signal RST and the low-logic level of the data signal SO, the horizontal low-voltage pulse signals of the first to Mth horizontal lines are latched as logic-low level GND until the next activate pulse signal is received. The sudden current spike generated by the positive/negative high-voltage output signals can be avoided.

Figure 5:
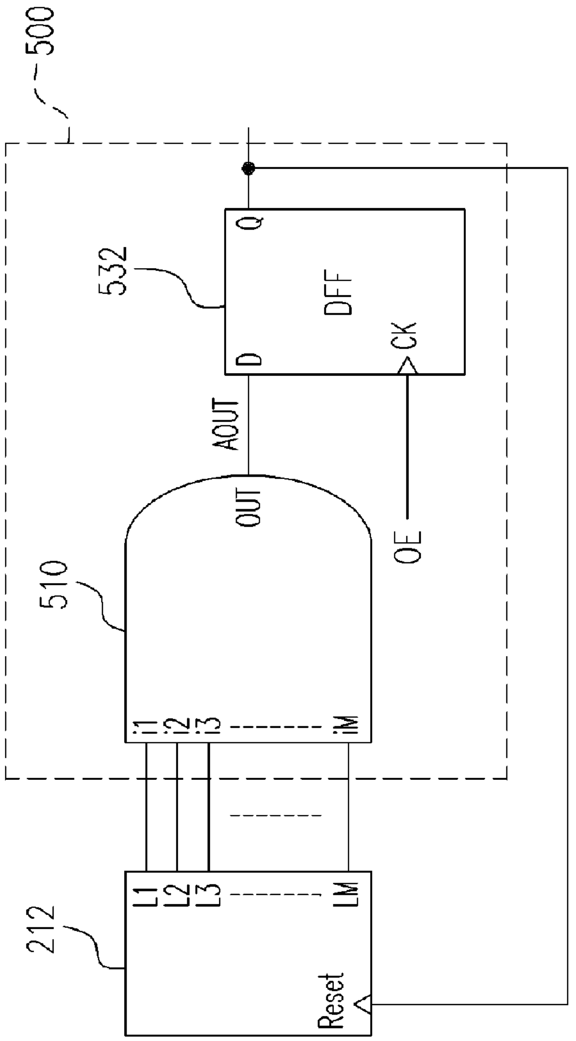
FIG. 5 is a drawing showing a current overdrive protection circuit with a single edge-triggered flip-flop which originally comprised a double edge-triggered flip-flop and a logic inverter.

The double edge-triggered flip-flop 530 can be positively or negatively triggered. Accordingly, the double edge-triggered flip-flop 530 is sensitive to the variation of the output enable signal OE. In some embodiments, due to the concerns of costs or other reasons, the single edge-triggered flip-flop 532 shown in FIG. 5 can be used.

Figure 6:
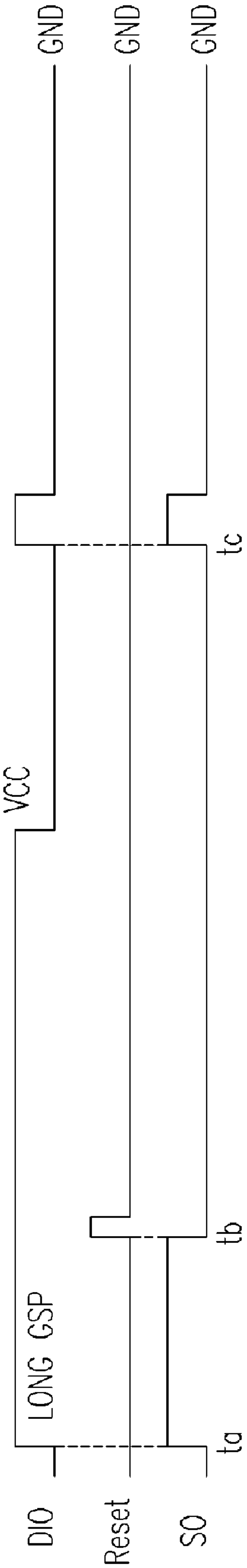
FIG. 6 is a sequence of the activate pulse signal DIO, the reset signal Reset, and the data signal SO of the current overdrive protection circuit in FIG. 4.

Referring to FIG. 6, the data signal SO varies with the activate pulse signal DIO, and is pulled up to the logic-high level at time ta. If the time period of the logic-high activate pulse signal DIO is too long, a reset signal Reset is triggered at time tb. Then, the data signal SO will be pulled down to the logic-low level. If the activate pulse signal DIO is pulled down to the logic-low level, the data signal SO varies with the activate pulse signal DIO and changes its logic level again at the time tc.

Figure 7:
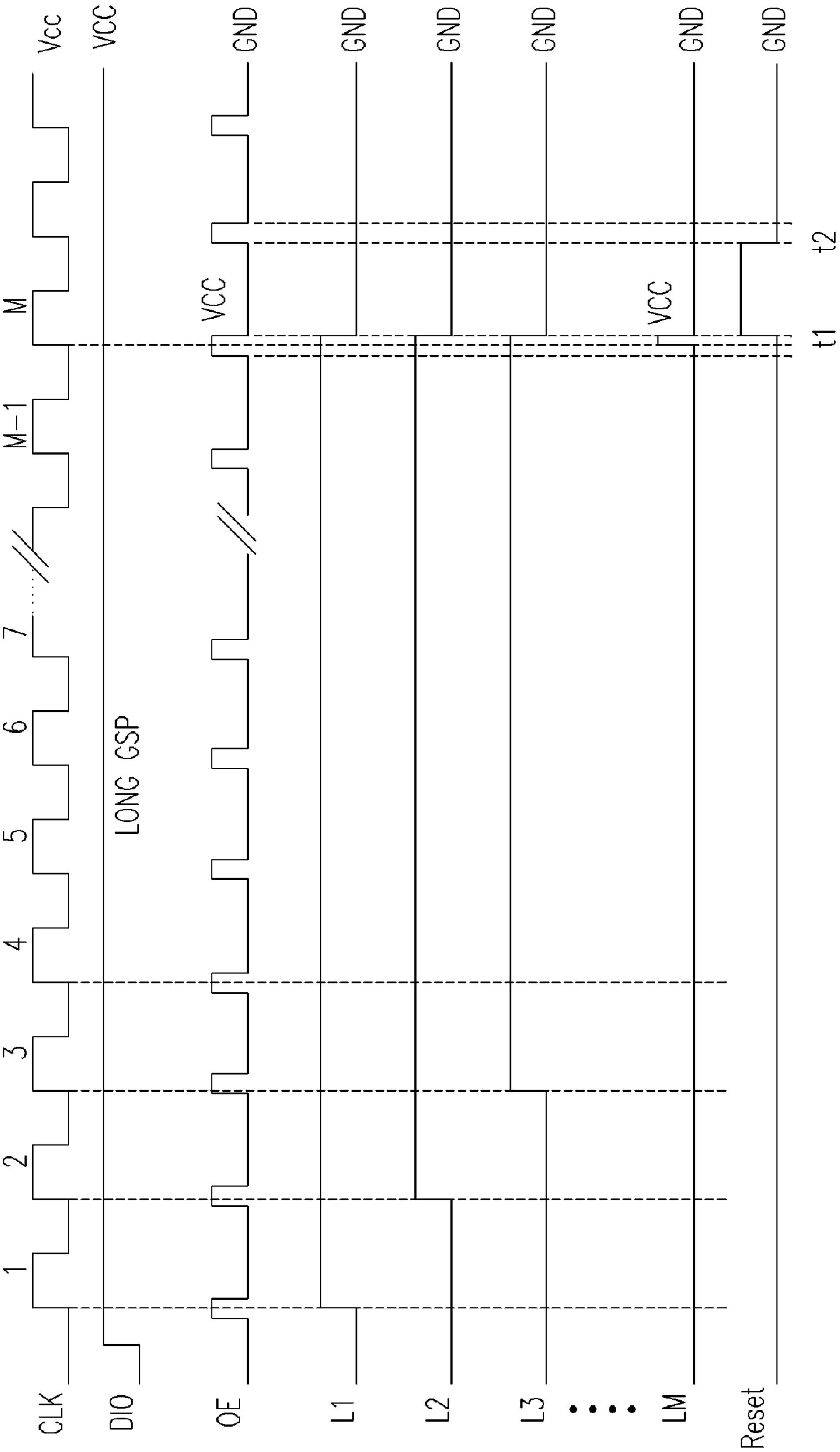
FIG. 7 is a sequence of the protection operation when the current overdrive protection circuit in FIG. 4 receives abnormal input signals.

Referring to FIG. 7, the gate driving device is in abnormal situation. The activate pulse signal DIO outputs a logic-high level pulse signal with a long period of time. The clock signal CLK and the output enable signal OE are under normal operation. Referring to FIG. 7, the horizontal low-voltage pulse signals (L1, L2, L3, . . . , LM) of the first to Mth horizontal lines are sequentially pulled up to the logic-high level according to the raise of the clock signal CLK. When the horizontal low-voltage pulse signal LM of the Mth horizontal line is pulled up to the high-logic level, the reset signal Reset is triggered at the time t1. As a result, the horizontal low-voltage pulse signals (L1, L2, L3, . . . , LM) of the first to Mth horizontal lines are pulled down to the logic-low level. The reset signal Reset is back to the low-logic level and latches the front-end control circuit. Before the activate pulse signal DIO is back to the low-logic level, the horizontal low-voltage pulse signals (L1, L2, L3, . . . , LM) of the first to Mth horizontal lines are maintained at the low-logic level.

Figure 8:
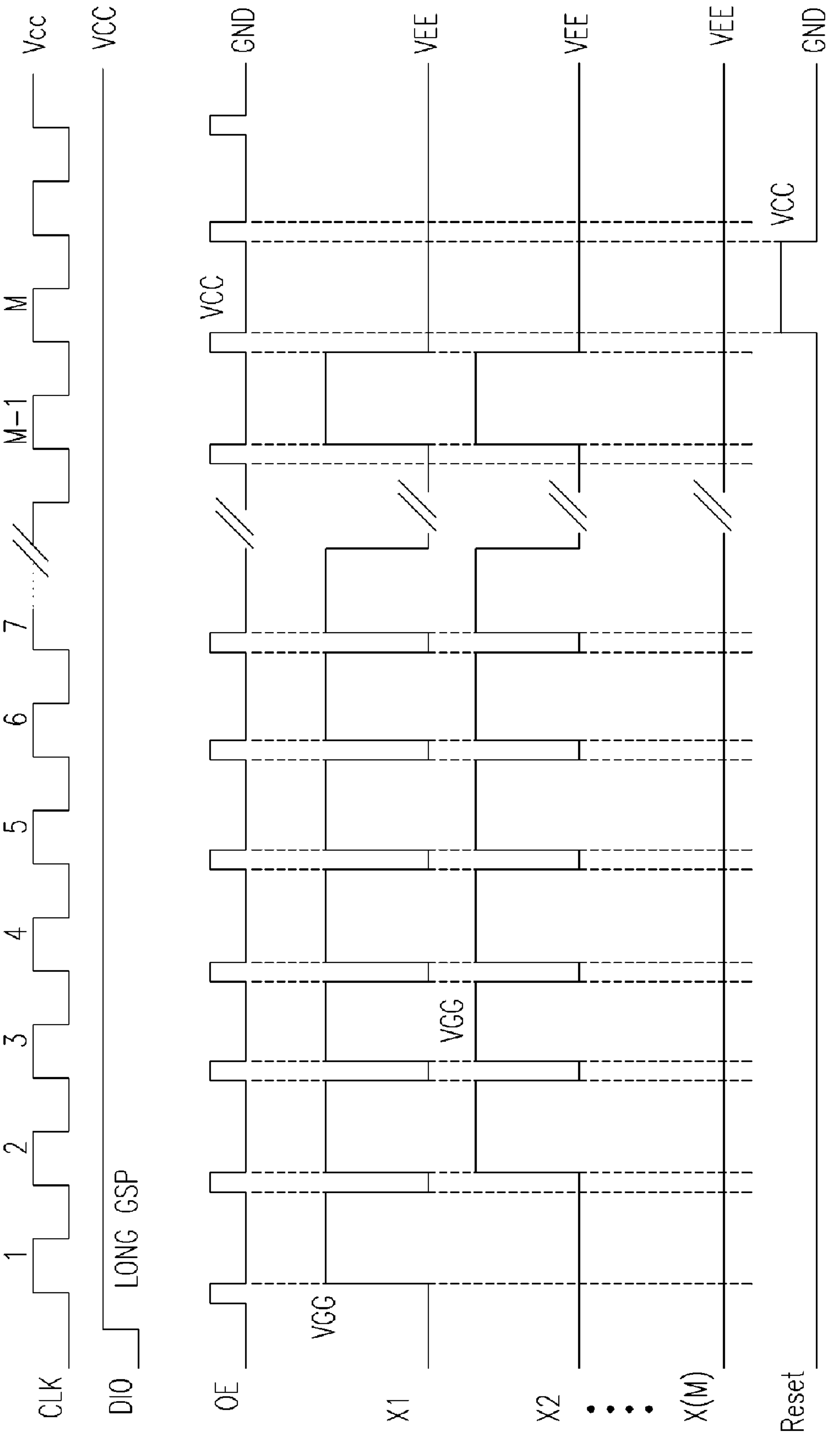
FIG. 8 is a sequence of the protection operation and the positive/negative high-voltage output when the gate driving device with the current overdrive protection receives abnormal input signals.

Referring to FIG. 8, the gate driving device is in abnormal situation. The activate pulse signal DIO outputs a logic-high level pulse signal with a long period of time. The clock signal CLK and the output enable signal OE are under normal operation. Referring to FIG. 7, the horizontal positive/negative high-voltage pulse signals (X1, X2, X3, . . . , XM) of the first to Mth horizontal lines perform abnormal positive/negative high-voltage switches according to the variation of the output enable signal OE. Before the positive/negative high-voltage signal X(M) of the first to Mth horizontal line performs the positive/negative high-voltage switch, the reset signal Reset is triggered. As a result, the horizontal positive/negative high-voltage pulse signals (X1, X2, X3, . . . , XM) of the first to Mth horizontal lines are pulled back and latched at the negative high voltage VEE. Accordingly, the simultaneous switches of many high voltage signals of the multiple horizontal lines can be avoided.

In the general gate driving device of the thin film transistor liquid crystal display (TFT LCD), the width of the activate pulse signal DIO is substantially equal to a period of the clock signal CLK. When the width of the activate pulse signal DIO is larger than a period of the clock signal CLK, it can be deemed as an abnormal input.

Figure 9:
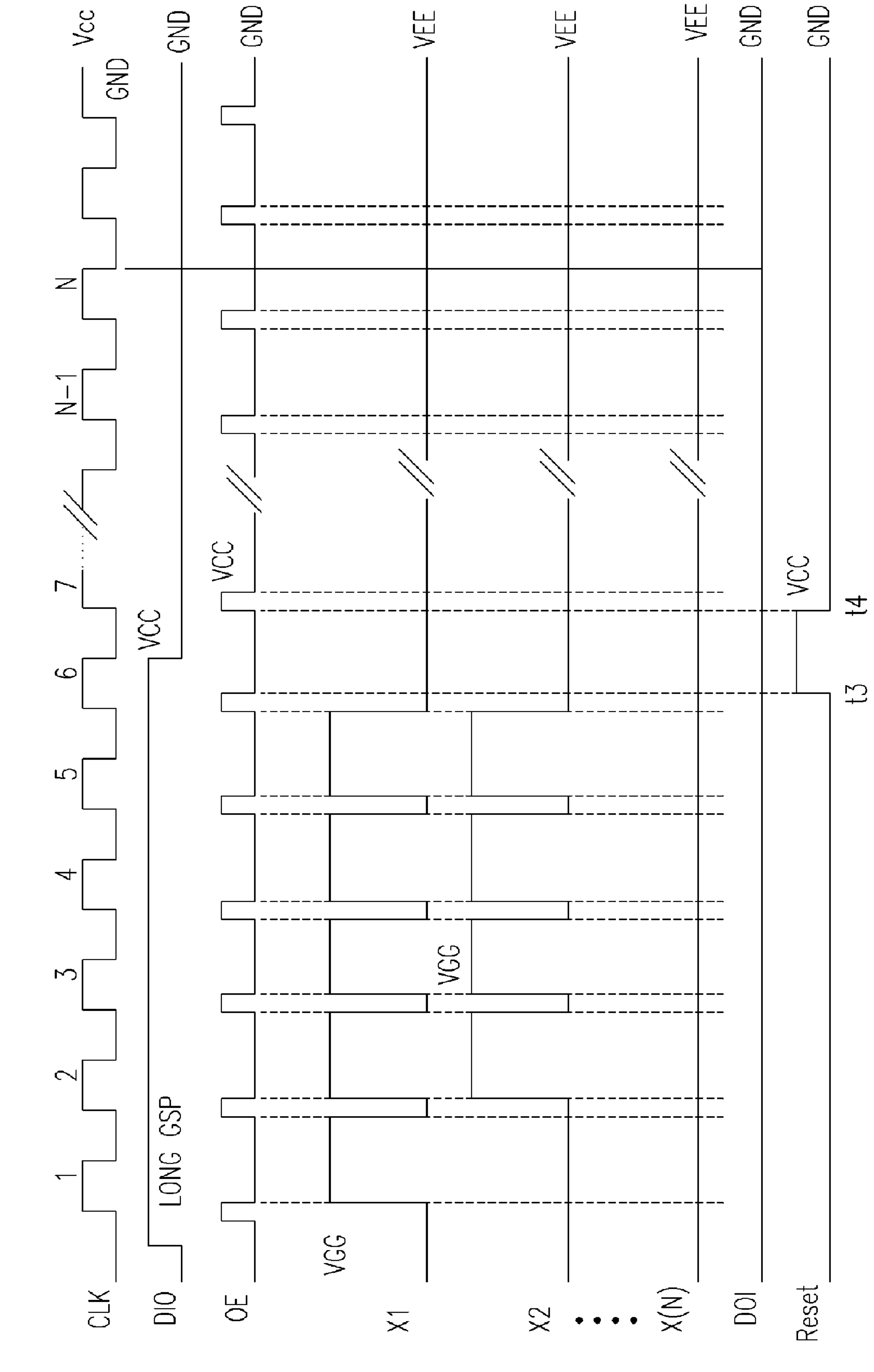
FIG. 9 is a sequence of the protection operation and the positive/negative high-voltage output when the time period of the abnormal input signal is equal to, or larger than 6 time periods of the clock signal CLK according to the gate driving device with the current overdrive protection.

Referring to FIG. 9, if M is 6, and the width of the activate pulse signal DIO is larger than, or equal to 6 periods of the clock signal CLK, the reset signal Reset is triggered. Before the time t3, the first, second, third, and fifth horizontal lines are switched and output positive/negative high voltages VGG and VEE. When the reset signal Reset is triggered between the times t3 and t4, the first to the Nth horizontal lines output the negative high voltage VEE to avoid a sudden high current, a high average current, or a current spike. As a result, the damage of the high-voltage circuit routes of the LCD ITO and the damage of the gate driving device can be avoided.

Although the present invention has been described in terms of exemplary embodiments, it is not limited thereto. Rather, the appended claims should be constructed broadly to include other variants and embodiments of the invention which may be made by those skilled in the field of this art without departing from the scope and range of equivalents of the invention.

What is claimed is:

1. A gate driving device, adapted for a display panel, comprising:

- a control circuit, receiving and outputting a plurality of logic control signals, comprising:
  - a flip-flop circuit, an input terminal of the flip-flop circuit receiving a logic high level, a clock terminal of the flip-flop circuit receiving an activate pulse signal, a clear terminal receiving a reset signal, an output terminal of the flip-flop circuit outputting a selective signal; and a multiplexer, comprising a plurality of signal input terminals, a selective terminal and a signal output terminal, one of the signal input terminals receiving a logic-low level signal, one of the signal input terminals receiving the activate pulse signal, the selective terminal receiving the selective signal, the signal output terminal outputting a data signal generated according to statuses of the logic-low level signal, the activate pulse signal, and the selective signal;

a shift register circuit coupled to the control circuit, receiving the data signal and a clock signal of the logic control signals, and sequentially outputting a first number of first horizontal voltage pulse signals;

a voltage level shifter, receiving and transforming the first number of the first horizontal voltage pulse signals into a first number of second voltage output signals;

a high-voltage buffer block coupled to the voltage level shifter, receiving the first number of the second voltage output signals to buffer a driving for the display panel; and a current overdrive protection circuit coupled to the control circuit and the shift register circuit, receiving an output enable signal which is among one of the logic control signals and a plurality of a second number of the first horizontal voltage pulse signals which are among the first number of the first horizontal voltage pulse signals, and outputting a reset signal while being triggered to prevent generation of a sudden current spike.

2. The gate driving device of claim 1, wherein the second voltage output signals are positive high-voltage output signals or negative high-voltage output signals.

3. The gate driving device of claim 1, wherein the shift register circuit comprises:

an output enable terminal, receiving the output enable signal;

a data input terminal, receiving the data signal;

a clock terminal, receiving the clock signal;

a first number of first horizontal voltage pulse signal output terminals, outputting the first number of the first horizontal voltage pulse signals according to variations of the clock signal and the data signal; and a reset input terminal, receiving the reset signal.

4. The gate driving device of claim 1, wherein the voltage level shifter comprises:

a first number of first horizontal voltage pulse signal input terminals, receiving the first number of the first horizontal voltage pulse signals; and a first number of positive/negative voltage output terminals, sequentially transforming voltage levels into the first number of the second voltage output signals.

5. The gate driving device of claim 1, wherein the high-voltage buffer block comprises a first number of high-voltage buffer driving circuits, each of the high-voltage buffer driving circuits receiving the second voltage output signals and buffering the driving of the display panel.

6. The gate driving device of claim 5, wherein the high-voltage buffer driving circuits are PMOS or NMOS high-voltage inverters.

7. The gate driving device of claim 1, wherein the current overdrive protection circuit comprises:

a logic operational circuit coupled to the shift register circuit, receiving the second number of the first horizontal voltage pulse signals of the first number of the first horizontal voltage pulse signals, and outputting a logic operational signal; and a logic responsive circuit, receiving the logic operational signal, receiving the output enable signal, and outputting the reset signal.

* * * * *